US007967376B2

(12) United States Patent
Przybylo et al.

(10) Patent No.: US 7,967,376 B2
(45) Date of Patent: Jun. 28, 2011

(54) CHILD SAFETY SEAT WITH LOAD LIMITED BASE

(75) Inventors: Phillip Przybylo, Waxhaw, NC (US); Benjamin Shane Bustle, Charlotte, NC (US)

(73) Assignee: Britax Child Safety, Inc., Charlotte, NC (US)

( * ) Notice: Subject to any disclaimer, the term of this patent is extended or adjusted under 35 U.S.C. 154(b) by 2 days.

(21) Appl. No.: 12/299,139

(22) PCT Filed: Apr. 5, 2007

(86) PCT No.: PCT/US2007/066062
§ 371 (c)(1),
(2), (4) Date: Aug. 3, 2009

(87) PCT Pub. No.: WO2007/118145
PCT Pub. Date: Oct. 18, 2007

(65) Prior Publication Data
US 2009/0302647 A1    Dec. 10, 2009

Related U.S. Application Data

(60) Provisional application No. 60/744,281, filed on Apr. 5, 2006.

(51) Int. Cl.
*B60R 21/00*    (2006.01)
*B60N 2/42*    (2006.01)
(52) U.S. Cl. .................................................. 297/216.11
(58) Field of Classification Search ............. 297/216.11, 297/216.1, 250.1, 256.13, 216.16, 216.19
See application file for complete search history.

(56) References Cited

U.S. PATENT DOCUMENTS

| 4,215,900 | A | * | 8/1980 | Coult ............................. 297/254 |
| 5,462,333 | A |   | 10/1995 | Beauvais |
| 5,664,830 | A |   | 9/1997 | Garcia |
| 5,685,603 | A | * | 11/1997 | Lane, Jr. .................. 297/216.11 |
| 6,454,350 | B1 |  | 9/2002 | Celestina-Krevh |

OTHER PUBLICATIONS

International Preliminary Report on Patentability from International Appl. No. PCT/US2007/066062, issued Oct. 8, 2008.

* cited by examiner

*Primary Examiner* — Milton Nelson, Jr.
(74) *Attorney, Agent, or Firm* — Alston & Bird LLP (57) ABSTRACT

A load-limited seat base for a child safety seat, including an attachment element carried by the seat base for attaching the seat base to a seating element, and a transversely-extending load absorbing assembly positioned in the base and cooperating with the seating element to permit the seating element to be selectively positioned in a recline position and an upright position relative to the base. The load absorbing assembly includes an elongate deforming member and a positioning block having at least a first recline position and a second upright position corresponding to the recline position and the upright position within which the deforming member is positioned. The deforming member is selectively positionable in the positioning block to position the seating element in the selected recline or upright position. The deforming member in either the recline or upright position is positioned such that an acceleration of the base causing a load of predetermined severity deforms the deforming member against the positioning block at a controlled rate, reducing the acceleration and thus the load on the seating element.

16 Claims, 8 Drawing Sheets

CHILD SAFETY SEAT WITH LOAD LIMITED BASE

TECHNICAL FIELD AND BACKGROUND OF THE INVENTION

This invention relates generally to seats, and specifically to child safety seats of the type that are releasably mounted onto car seats in order that the occupant be provided with enhanced security from injury during automobile travel. Such seats are now legally mandated in many parts of the world. The particular embodiment disclosed in this application is a convertible-type child safety seat designed to be placed in either a forward-facing or rearward-facing orientation with respect to the automobile or other vehicle in which it is mounted. In either case, the seat is attached to the vehicle seat with either the vehicle passenger seat belt, or with special latches, for example "Isofix" latches, by which the child safety seat is latched to the vehicle body.

Whether forward or rearward-facing, child safety seats are subject to substantial acceleration during a vehicle collision. Various factors, including whether the collision is to the front or rear of the vehicle and whether the child safety seat is facing to the front or the rear determine the amount of force transmitted through the vehicle, the child safety seat and to the seat occupant. In the particular embodiment disclosed in this application, the child safety seat has a range of adjustment by which the seating element can be placed into a relatively upright or reclined position. This requires a degree of adjusting movement between the stationary base and moveable seating element. It has been found desirable to limit the load placed on the seating element and base by accommodating and restricting acceleration of the seating element relative to the base.

Because the sole purpose of the child safety seat is to protect the occupant, the load limiting feature can be made deliberately sacrificial whereby elements of the seat are damaged to the point where the seat is no longer operable. By rendering the seat adjustment feature of the seat inoperable as a result of an impact, the seat is more likely to be discarded and replaced, rather than to be continued in use.

SUMMARY OF THE INVENTION

Therefore, it is an object of the invention to provide a load limited base for a child safety seat.

It is another object of the invention to provide a child safety seat that has a load limited base that reduces acceleration of the seating element of the seat in a collision.

It is another object of the invention to provide a child safety seat that has a load limited base that reduces acceleration of the seating element of the seat whether the seat is forwardly or rearwardly mounted.

It is another object of the invention to provide a child safety seat that has a load limited base that reduces acceleration of the seating element when the seating element is both in an upright and reclined position.

It is another object of the invention to provide a child safety seat that has a load limited base that, after a collision, reduces the utility of the seat and therefore increases the likelihood that a collision-damaged seat will not continue to be used.

These and other objects and advantages of the invention are achieved by providing a load-limited seat base for a child safety seat, comprising an attachment element carried by the seat base for attaching the seat base to a seating element, and a transversely-extending load absorbing assembly positioned in the base and cooperating with the seating element to permit the seating element to be selectively positioned in a recline position and an upright position relative to the base. The load absorbing assembly includes an elongate deforming member and a positioning block having at least a first recline position and a second upright position corresponding to the recline position and the upright position within which the deforming member is positioned. The deforming member is selectively positionable in the positioning block to position the seating element in the selected recline or upright position. The deforming member in either the recline or upright position is such that an acceleration of the base causing a load of predetermined severity deforms the deforming member against the positioning block at a controlled rate, reducing the acceleration and thus the load on the seating element.

According to one preferred embodiment of the invention, the deforming member comprises a metal member and the positioning block comprises a plastic member with a plurality of spaced-apart reenforcing ribs having first and second slots defining the first recline position and the second upright position within which the deforming member is positioned when the seating element is in the respective recline and upright positions.

According to another embodiment of the invention, a child safety seat is provided that includes a seating element sized and contoured to seat a child therein and a seat base for supporting the seating element on a vehicle car seat. An attachment element is carried by the seat base for attaching the seat base to the seating element, and a transversely-extending load absorbing assembly is positioned in the base and cooperates with the seating element to permit the seating element to be selectively positioned in a recline position and an upright position relative to the base. The load absorbing assembly includes an elongate deforming member and a positioning block having at least a first recline position and a second upright position corresponding to the recline position and the upright position within which the deforming member is positioned. The deforming member is selectively positionable in the positioning block to position the seating element in the selected recline or upright position, and the deforming member in either the recline or upright position is such that an acceleration of the base causing a load of predetermined severity deforms the deforming member against the positioning block at a controlled rate, reducing the acceleration and thus the load on the seating element.

According to another embodiment of the invention, a child safety seat is provided, and includes a seating element sized and contoured to seat a child therein carried by a base for supporting the seating element on a vehicle car seat, and a transversely-extending load absorbing assembly positioned in the base and cooperating with the seating element to permit the seating element to be selectively positioned in a recline position and an upright position relative to the base. The load absorbing assembly includes an elongate deforming metal tube and a molded plastic positioning block having a recline position and the upright position within which the deforming metal tube is positioned. The deforming metal tube is selectively positionable in the positioning block to position the seating element in the selected recline or upright position. The deforming metal in either the recline or upright position is such that an acceleration of the base causing a load of predetermined severity deforms the deforming member against the positioning block at a controlled rate, reducing the acceleration and thus the load on the seating element. A handle with a biasing member is optionally provided for normally urging the positioning block into engagement with the deforming member. The handle is connected to the positioning block for allowing the positioning block to be retracted away from the elongate metal member when the seating element is being repositioned from one of the recline and upright positions to the other.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENTS AND BEST MODE

Figure 1:
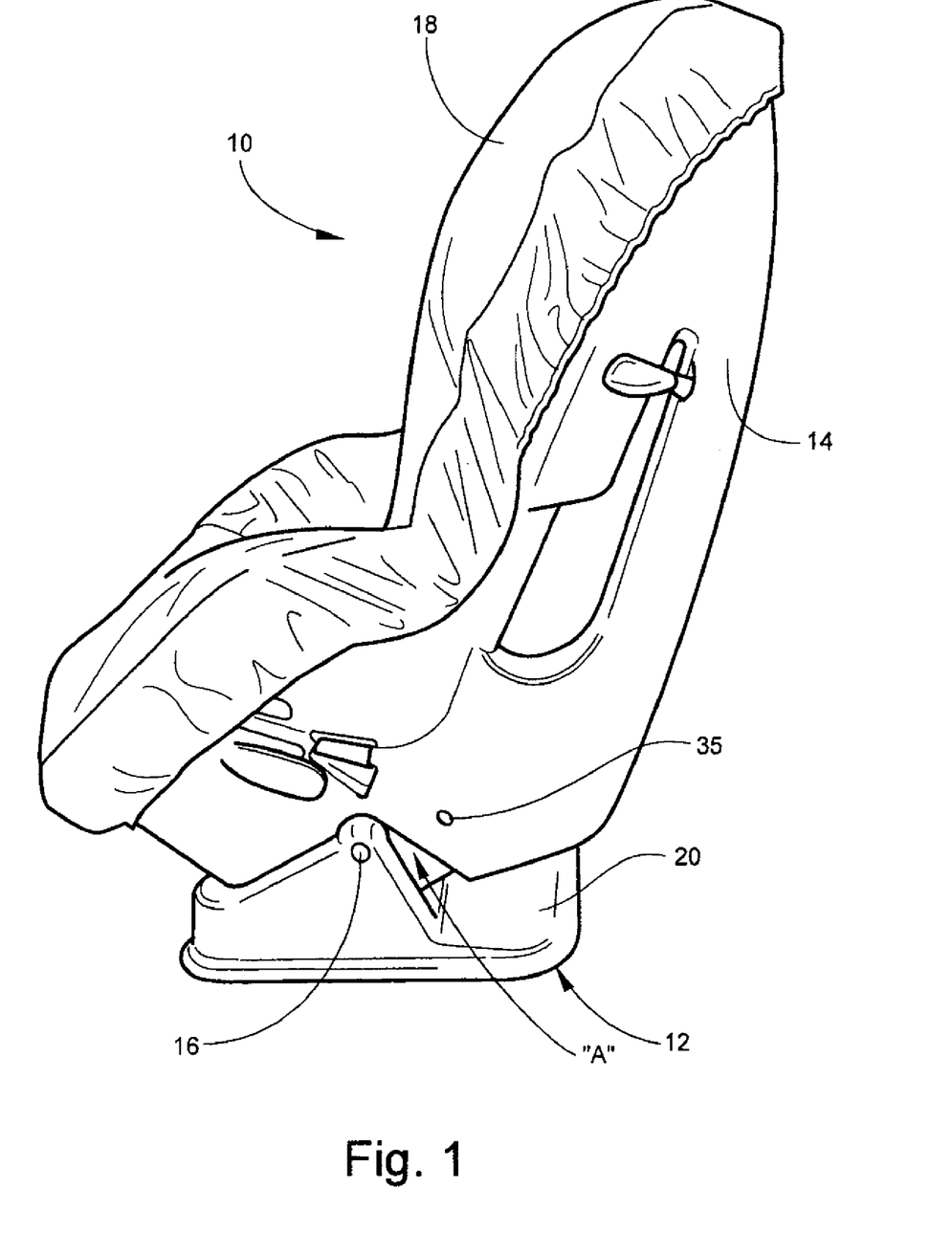
FIG. 1 is a side view of a child safety seat according to an embodiment of the invention, shown in the upright position.
Figure 2:
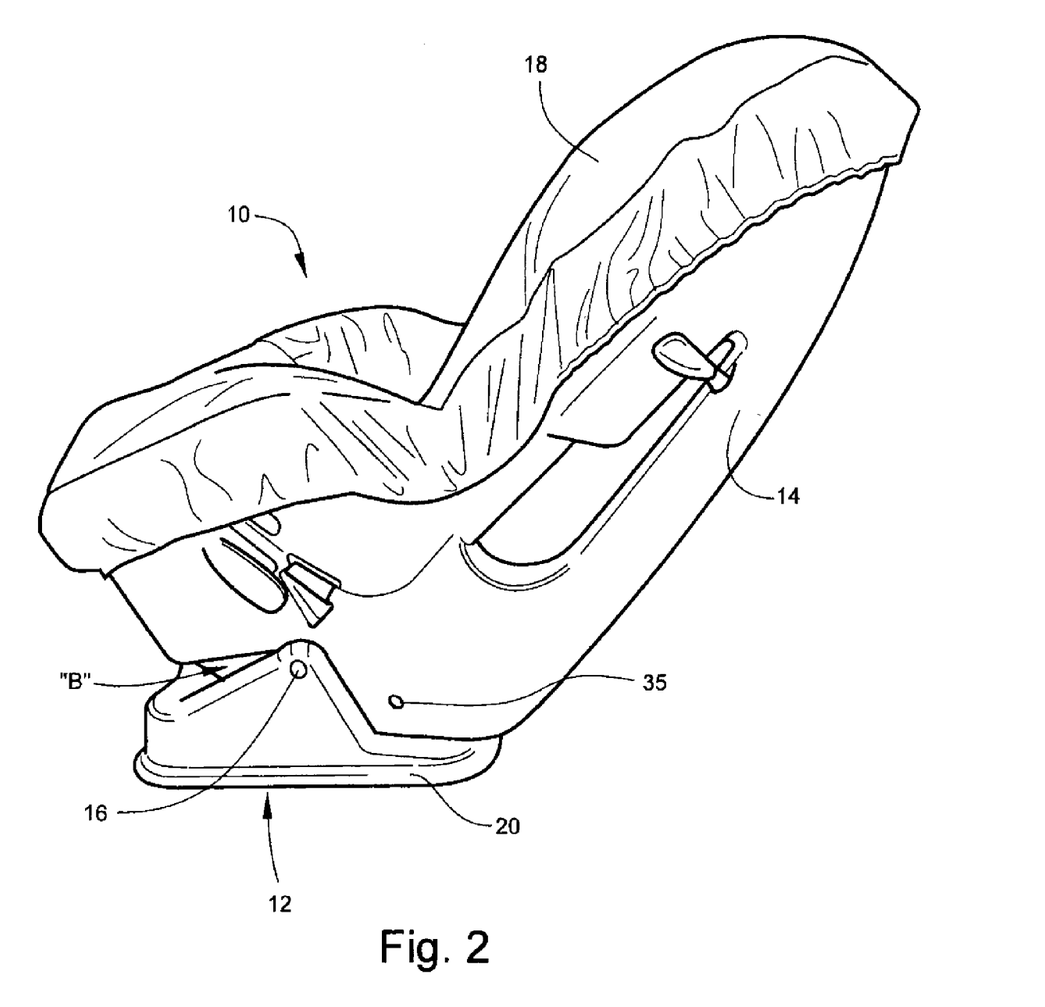
FIG. 2 is a side view of a child safety seat according to an embodiment of the invention, shown in the reclined position.
Figure 3:
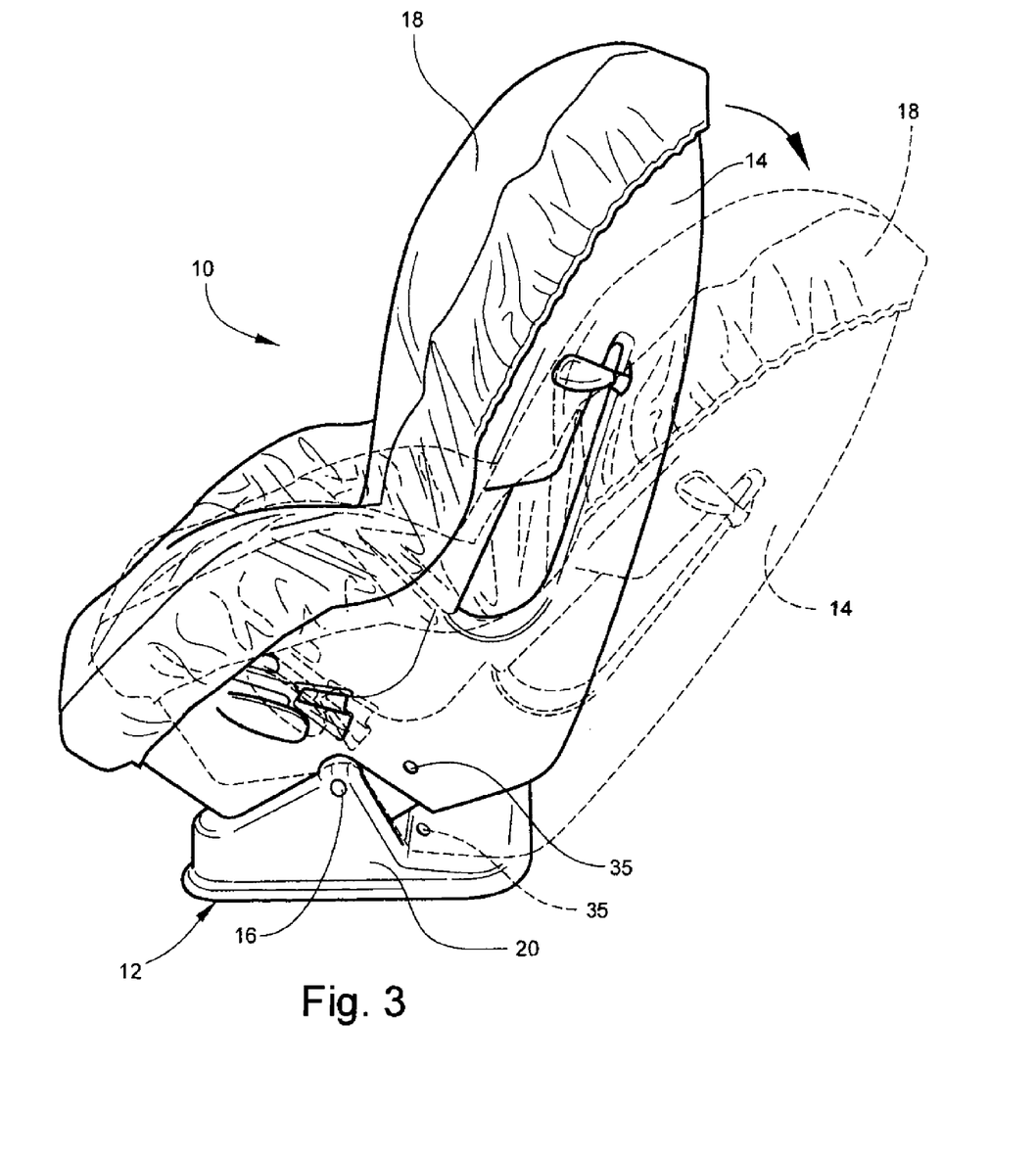
FIG. 3 is a side view of a child safety seat according to an embodiment of the invention, shown in both the upright and reclined position.
Figure 4:
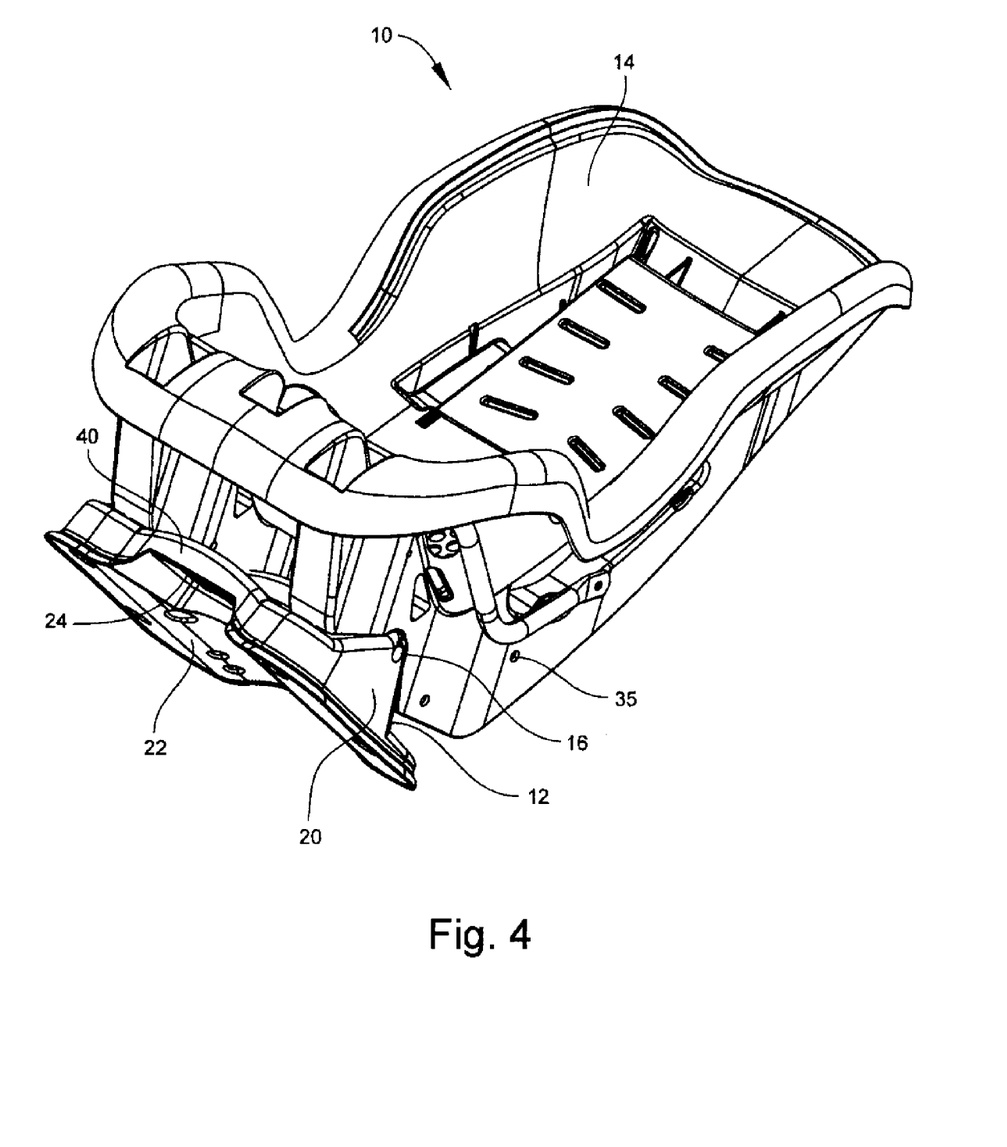
FIG. 4 is a perspective view of a child safety seat according to an embodiment of the invention with upholstery removed for clarity.

Referring now specifically to the drawings, a child safety seat according to the present invention is shown generally in FIGS. 1, 2 and 3 at reference numeral 10. The child safety seat 10 includes a seat base 12 and a seating element 14 that is mounted to the base by a axle 16 that extends transversely through the lower portion of the seating element and is mounted in an upper portion of the base, as shown. FIGS. 1 and 2 show the child safety seat 10 with the seating element 14 in its upright position and reclined position, respectively. The seating element 14 is covered by suitable padding and upholstery 18. FIG. 3 illustrates the load bearing areas of the seating element 14 on the base 12 in both the upright and reclined positions. FIG. 4 shows the structure of the seating element 14 underlying the upholstery 18. Seats 10 of the type described in this application are designed to accommodate children whose weight lies within differing ranges. The particular seat 10 described in this application has a weight range of between 5 and 65 pounds.

Figure 5:
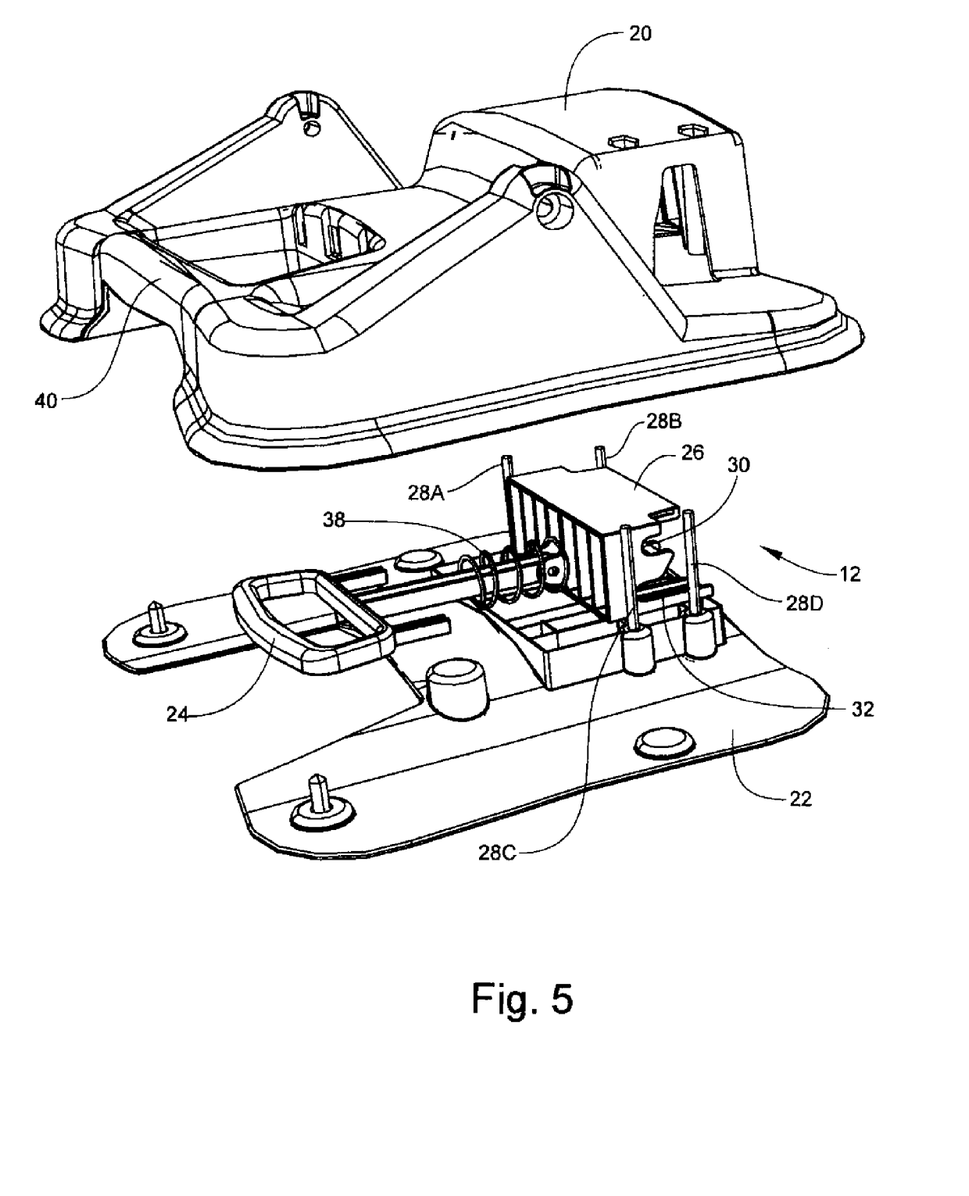
FIG. 5 is a partial exploded perspective view of the seat base.
Figure 6:
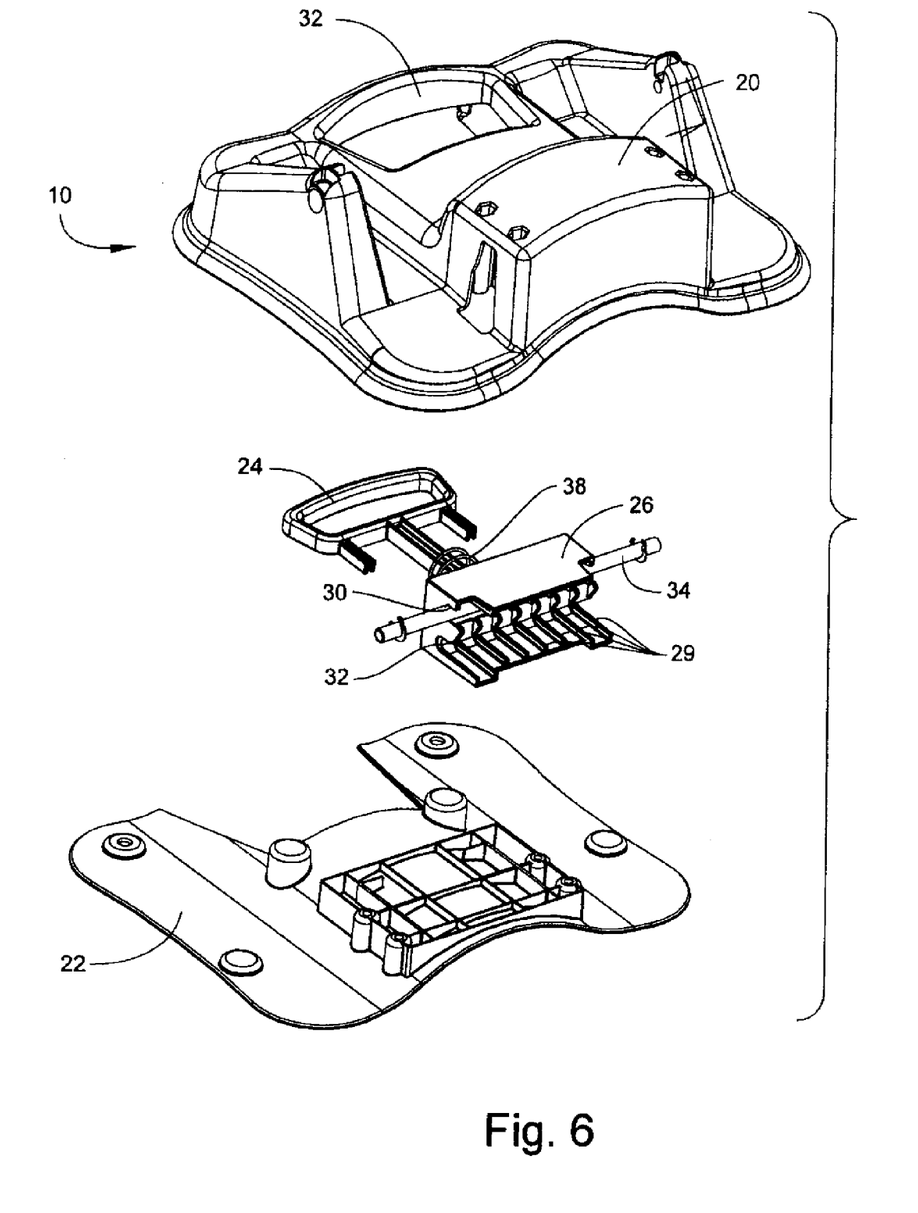
FIG. 6 is another partial exploded perspective view of the base showing the position of the load absorbing member.

The base 12 includes a base top 20 that directly supports the seating element 14, and a base bottom 22 that encloses the bottom of the base top 20 and provides a relatively level, stable supporting surface for the base 12. Adjustment of the seating element 14 between the upright and reclined positions is effected by a handle 24 positioned for access from the front of the base 12. As is shown in FIG. 5, the handle 24 is attached to a robust positioning block 26 that is securely mounted between the base top 20 and base bottom 22 by bolts 28A-D. The positioning block 26 is molded of plastic and is provided with multiple reinforcing ribs 29 to provide additional rigidity and resistence against loading. The positioning block 26 defines on the rear end thereof two transversely-extending slots 30, 32 adapted to selectively capture and retain a load-absorbing member—in the preferred embodiment shown, a steel tube 34. Opposite ends of the tube 34 are positioned in and retained in bores 35, 36 in opposing sides of the seating element 14, as shown in FIGS. 1-4 and 7. While the load-absorbing member is shown by way of illustration as the tube 34, other load-absorbing members may also be used, including, but not limited to, other tubular members having various cross-sectional geometries, solid rod or bar stock, single or laminated strips of energy-absorbing material such as carbon fiber, resins or honeycomb structures. In the preferred embodiment disclosed herein the tube 34 is a 10/10 low carbon steel with an outside diameter of ⅜ inch and an 18 gauge wall thickness. In general, the load-absorbing member should be adapted to both act as the means by which the seat is adjusted to the upright and reclined positions and as the load-absorbing element in the event of a severe load being placed on the seat 10.

The handle 24 is loaded by a spring 38 and is biased inwardly towards the center of the base 12. The handle 24 is pulled outwardly towards the front of the base 12 when the position of the seating element 14 is to be changed. This is accomplished by placing the palm of the hand against a grip 40 molded as a part of the base 12, best shown in FIGS. 4 and 5, placing the fingers over and around the handle 24, and pulling the handle 24 with the finders by curling the finders towards the grip 40. This retracts the positioning block 26 away from the stationary tube 34. With the positioning block 26 in this retracted position, the seating element 14 and the tube 34 are unrestricted in their movement by the positioning block 26, and the seating element may be pivoted about the axle 16 forward into the upright position shown in FIG. 1, or rearward into the reclined position shown in FIG. 2. See also FIG. 3. When the seating element 14 is pivoted to the desired position, the handle 24 is released and the spring 38 returns the handle 24 to its locked position, driving the positioning block 26 rearwardly, capturing the tube 34 in either the slot 30 for the upright position or the slot 32 for the reclined position.

In the event of a severe load being applied to the seat 10, the load absorbing action of the tube 34 depends on whether the seat 10 is facing to the front or rear, the direction from which the load is applied, and whether the seat 10 is in the upright or reclined position.

Figure 7:
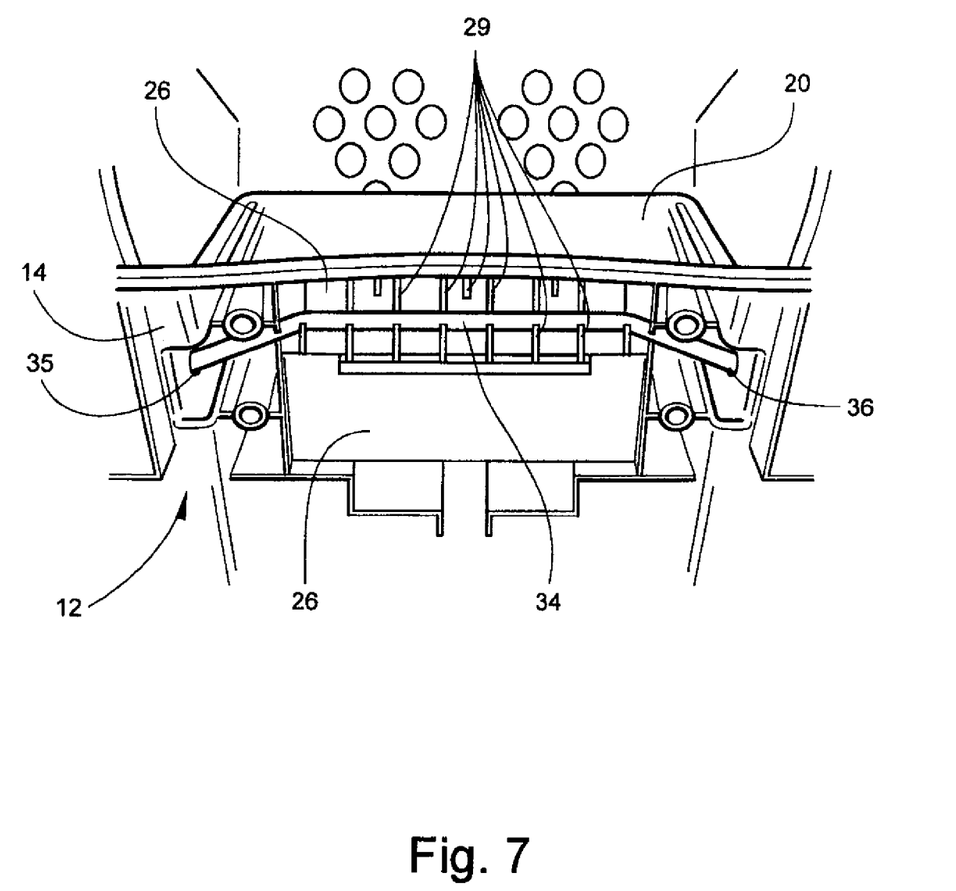
FIG. 7 is a partial view of the base, with the base bottom removed, showing deformation of the load absorbing member after a load has been applied to the seat.

By way of example, note that in FIG. 1 the upright position of the seat 10 a rearward-diverging gap is present, shown at "A", between the base 12 and the seating element 14. The tube 34 is positioned in the lower slot 32 of the positioning block 26. If the seat 10 is facing forward and the load is applied to the seat 10 from the front, as in a front-end collision, the base 12 and seating element 14 first move forwardly together as the vehicle within which the seat 10 is mounted rapidly decelerates, and then the seating element 14 rebounds rearwardly relative to the base 12, closing the gap "A". The presence of the load absorbing member in the form of the tube 34 absorbs a substantial percentage of this load by preventing a virtually instantaneous rebound impact between the seating element 12 and base 14 as the gap "A" closes, and, instead, deforming under the load at a controlled, reduced velocity, reducing the acceleration and thus the load on the seating element 14. The tube 34 is bent downwardly by the movement of the loaded seating element 14 into the gap "A". This is shown in FIG. 7. A similar downward deformation of the tube 34 results if the seat 10 is facing to the rear and a front or rear impact occurs.

In another example, if the seat 10 is in the reclined position as shown in FIG. 2, a forward diverging gap is present, shown at "B", between the base 12 and the seating element 14. In the reclined position tube 34 is positioned in the upper slot 30 of the positioning block 26. If the seat 10 is facing forward and the loading is applied to the seat 10 from the rear, as in a rear-end collision, the base 12 and seating element 14 first move rearwardly together as the vehicle within which the seat 10 is mounted accelerates forward under the influence of the rear impact, and then the seating element 14 rebounds forwardly relative to the base 12, closing the gap "B". The tube 34 absorbs a substantial percentage of this load by preventing a virtually instantaneous rebound impact between the seating element 12 and base 14, and, instead, deforming under the load at a controlled, reduced velocity, reducing the acceleration and thus the load on the seating element 14. A similar result occurs if the seat 10 is facing to the rear and a front or rear impact occurs. In both instances the tube 34 is deformed upwardly as it absorbs the load applied to the seating element 14.

Thus, the tube 34 will act to reduce the load on the seating element and thus the seat occupant without regard to the orientation of the seat 10 relative to the vehicle, the direction of impact, or the upright or reclined position of the seating element. The bending of the tube 34 renders the adjustment feature of the seat 10 inoperative. This, together with other damage to the seat 10 depending on the force of the impact is intended to prompt disposal of the seat, rather than continued use.

Figure 8:
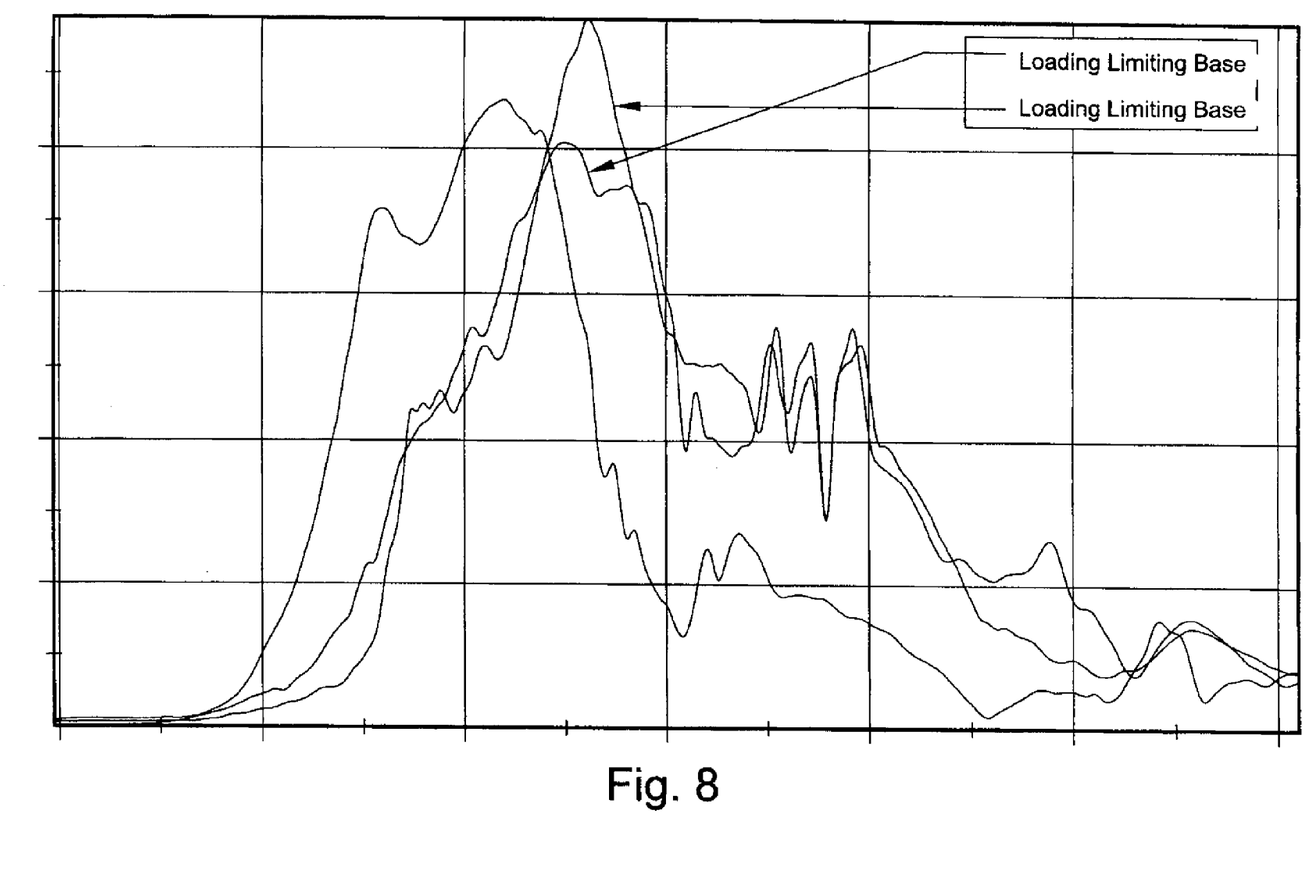
FIG. 8 is a graph showing test results of a base having a load-limiting feature according to an embodiment of the invention in comparison with a base with no load limited feature.

In one example, testing has indicated that the peak load on a head is reduced by approximately 11 percent with use of the load-limited base described above, as shown in FIG. 8, in which the y-axis is "acceleration", and the x-axis is "time."

An improved load limited base for a child safety seat is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

We claim:

1. A load-limited seat base for a child safety seat, comprising:
    (a) an attachment element carried by the seat base for attaching the seat base to a seating element;
    (b) a transversely-extending load absorbing assembly positioned in the base and cooperating with the seating element to permit the seating element to be selectively positioned in a recline position and an upright position relative to the base;
    (c) the load absorbing assembly including an elongate deforming member and a positioning block having at least a first recline position and a second upright position corresponding to the recline position and the upright position within which the deforming member is positioned;
    (d) the deforming member being selectively positionable in the positioning block to position the seating element in the selected recline or upright position; and
    (e) the deforming member in either the recline or upright position being positioned such that an acceleration of the base causing a load of predetermined severity deforms the deforming member against the positioning block at a controlled rate, reducing the acceleration and thus the load on the seating element.

2. A load-limited seat base according to claim 1, wherein the base comprises a base top for supporting the seating element and a base bottom for providing a stable supporting surface for the base on a vehicle car seat, the base top and base bottom collectively forming an enclosure within which the deforming member and positioning block are contained.

3. A load-limited seat base according to claim 1, wherein the deforming member comprises an elongate metal member and the positioning block comprises a plastic member with a plurality of spaced-apart reinforcing ribs having first and second slots defining the first recline position and the second upright position within which the deforming member is positioned when the seating element is in the respective recline and upright positions.

4. A load-limited seat base according to claim 3, and including a handle with a biasing member for normally urging the positioning block into engagement with the deforming member, the handle connected to the positioning block for allowing the positioning block to be retracted away from the elongate metal member.

5. A load-limited seat base according to claim 4, wherein the biasing member comprises a spring.

6. A load-limited seat base according to claim 3, wherein the metal member is selected from the group consisting of a metal tube, a metal bar, a metal rod, and single or laminated strips of carbon fiber, resin or honeycomb material.

7. A child safety seat, comprising:
    (a) a seating element sized and contoured to seat a child therein;
    (b) a seat base for supporting the seating element on a vehicle car seat;
    (c) an attachment element carried by the seat base for attaching the seat base to the seating element;
    (d) a transversely-extending load absorbing assembly positioned in the base and cooperating with the seating element to permit the seating element to be selectively positioned in a recline position and an upright position relative to the base;
    (e) the load absorbing assembly including an elongate deforming member and a positioning block having at least a first recline position and a second upright position corresponding to the recline position and the upright position within which the deforming member is positioned;
    (f) the deforming member being selectively positionable in the positioning block to position the seating element in the selected recline or upright position; and
    (g) the deforming member in either the recline or upright position being positioned such that an acceleration of the base causing a load of predetermined severity deforms the deforming member against the positioning block at a controlled rate, reducing the acceleration and thus the load on the seating element.

8. A child safety seat according to claim 7, wherein the base comprises a base top for supporting the seating element and a base bottom for providing a stable supporting surface for the base on a vehicle car seat, the base top and base bottom collectively forming an enclosure within which the deforming member and positioning block are contained.

9. A child safety seat according to claim 7, wherein the deforming member comprises an elongate metal member and the positioning block comprises a plastic member with a plurality of spaced-apart reinforcing ribs having first and second slots defining the first recline position and the second upright position within which the deforming member is positioned when the seating element is in the respective recline and upright positions.

10. A child safety seat according to claim 9, and including a handle with a biasing member for normally urging the positioning block into engagement with the deforming member, the handle connected to the positioning block for allowing the positioning block to be retracted away from the elongate metal member.

11. A child safety seat according to claim 10, wherein the biasing member comprises a spring.

12. A child safety seat according to claim 9, wherein the metal member is selected from the group consisting of a metal tube, a metal bar, a metal rod, and single or laminated strips of carbon fiber, resin or honeycomb material.

13. A child safety seat, comprising:
(a) a seating element sized and contoured to seat a child therein carried by a base for supporting the seating element on a vehicle car seat;
(b) a transversely-extending load absorbing assembly positioned in the base and cooperating with the seating element to permit the seating element to be selectively positioned in a recline position and an upright position relative to the base;
(c) the load absorbing assembly including an elongate deforming member and a molded plastic positioning block having a recline position and an upright position within which the deforming member is positioned;
(d) the deforming member being selectively positionable in the positioning block to position the seating element in the selected recline or upright position;
(e) the deforming member in either the recline or upright position being positioned such that an acceleration of the base causing a load of predetermined severity deforms the deforming member against the positioning block at a controlled rate, reducing the acceleration and thus the load on the seating element; and
(f) a handle with a biasing member for normally urging the positioning block into engagement with the deforming member, the handle connected to the positioning block for allowing the positioning block to be retracted away from the deforming member when the seating element is being repositioned from one of the recline and upright positions to the other.

14. A child safety seat according to claim 13, wherein the deforming member is selected from the group consisting of a metal tube, a metal bar, a metal rod, and single or laminated strips of carbon fiber, resin or honeycomb material.

15. A child safety seat according to claim 13, wherein the biasing member comprises a spring.

16. A child safety seat according to claim 13, wherein the deforming member is a 10/10 low carbon steel tube with an outside diameter of about ⅜ inch and an 18 gauge wall thickness.

* * * * *